E. P. WOODS & D. SHERWOOD.
Egg-Stands and Boilers.
No. 5,270. Reissued Feb. 4, 1873.
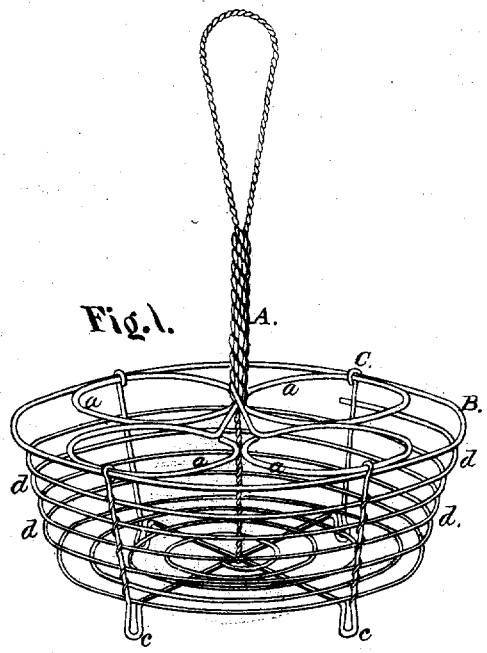
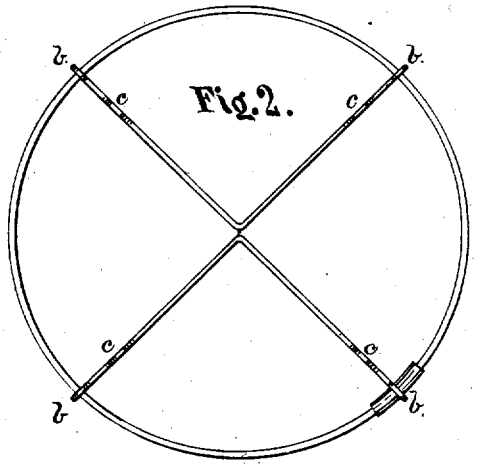
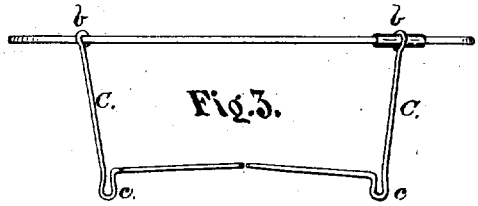
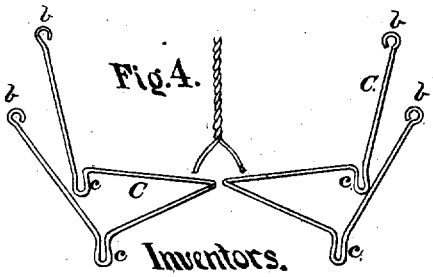
Witnesses.
E. H. Johnson
J. P. Cranford
Inventors.
Edward P. Woods
Daniel Sherwood
per E. A. Owgin Atty.
AM. PHOTO-LITHOGRAPHIC CO. N.Y. (OSBORNE'S PROCESS.)

UNITED STATES PATENT OFFICE.

EDWARD P. WOODS AND DANIEL SHERWOOD, OF LOWELL, MASSACHUSETTS, ASSIGNORS TO THEMSELVES AND CYRUS H. LATHAM.

IMPROVEMENT IN EGG STANDS AND BOILERS.

Specification forming part of Letters Patent No. 70,769, dated November 12, 1867; reissue No. 5,270, dated February 4, 1873.

DIVISION B.

*To all whom it may concern:*

Be it known that we, EDWARD P. WOODS and DANIEL SHERWOOD, of Lowell, in the county of Middlesex and State of Massachusetts, have invented certain new and useful Improvements in the Manufacture of Wire Stands or Holders, of which the following is a specification:

*Nature and Objects of the Invention.*

Our invention relates to stands or holders for domestic uses made of wire; and the invention consists in a novel construction of a stand or holder, as will be fully set forth hereafter.

*Description of the Drawing.*

Figure 1 is a perspective view of a stand or holder. Figs. 2, 3, and 4 show parts in detail.

Similar letters of reference indicate like parts in the drawing.

*General Description.*

We first make a ring of the desired size and join the ends together, as shown in Figs. 2 and 3, and form parts C C, which, when united, compose the frame. These parts are united together at the center, and are made with eyes *c c*, which form the legs for the stand, and with hooks *b b*, to clasp the ring and frame together. The spiral wire *d*, previous to being attached to the frame, is formed on a machine the construction and operation of which is fully set forth in Division A of this reissue. The said machine was the subject of Letters Patent No. 70,770, granted to us November 12, 1867. After the spiral has been formed the operator connects the wires together by means of fine wire, interlacing it until the whole is firmly secured together. The handle A and rings *a a* are attached thereto, as shown in the drawing. The handle A of the stand, shown in Fig. 1, is composed of wires twisted together, doubled to form the handle-loop, and made up into a compound twist, which gives strength thereto and forms a neat and ornamental junction of the wires. These wires are then separated and a part of them diverge to form the holder-rings and the remaining ones are twisted to form a continuation of the handle and to secure the rings and bottom of the stand together, as shown in Fig. 1 of the drawing.

The use of the compound wire-twist enables us to form a neat and strong union of the wires and to readily separate them for forming other parts of the stand in its manufacture.

We make our stands to hold any desired number of articles. Our stands are used for holding eggs for boiling for the table, and for domestic uses generally as an ornamental and useful holder.

*Claim.*

The combination with a stand or holder made of twisted wire of the compound twist shown in the handle A, for doubling and uniting the twisted wire together in the construction of the handle and then separating the wires, to be again twisted for the parts of the stand, substantially as described and specified.

EDWARD P. WOODS.
DANIEL SHERWOOD.

Witnesses:
H. F. SLOCUM,
C. H. COOKE.